United States Patent
Kowalski

(10) Patent No.: US 6,536,893 B2
(45) Date of Patent: Mar. 25, 2003

(54) WATERFAST AND SMEARFAST INKS USING INK JET DELIVERED DYE SUBLIMATION DYES

(75) Inventor: Mark H. Kowalski, Westford, MA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/761,444

(22) Filed: Jan. 16, 2001

(65) Prior Publication Data

US 2002/0130938 A1 Sep. 19, 2002

(51) Int. Cl.[7] .................................................. B41J 2/01
(52) U.S. Cl. ........................ 347/102; 342/101; 342/100; 428/195
(58) Field of Search ................................ 347/102, 100, 347/101, 105, 96, 95; 428/195; 106/31.27

(56) References Cited

U.S. PATENT DOCUMENTS

| | | | |
|---|---|---|---|
| 4,558,329 A | * 12/1985 | Honda | 346/76 |
| 5,278,584 A | 1/1994 | Keefe et al. | 346/140 R |
| 5,302,223 A | 4/1994 | Hale | 156/230 |
| 5,487,614 A | 1/1996 | Hale | 400/120.02 |
| 5,579,040 A | * 11/1996 | Sato et al. | 347/88 |
| 5,640,180 A | * 6/1997 | Hale et al. | 347/3 |
| 5,644,988 A | 7/1997 | Xu et al. | 101/488 |
| 5,734,396 A | 3/1998 | Hale et al. | 347/54 |
| 5,821,976 A | * 10/1998 | Inagaki et al. | 347/218 |
| 5,830,263 A | 11/1998 | Hale et al. | 106/31.27 |
| 5,903,297 A | * 5/1999 | Sasaki et al. | 347/171 |
| 6,071,368 A | 6/2000 | Boyd et al. | 156/240 |
| 6,090,749 A | 7/2000 | Kowalski | 503/227 |
| 6,264,321 B1 | * 7/2001 | Bugner et al. | 347/101 |
| 6,361,230 B1 | * 3/2002 | Crystal et al. | 400/615 |
| 6,467,898 B2 | * 10/2002 | Codos et al. | 347/102 |
| 2002/0044188 A1 | * 4/2002 | Codos | 347/106 |

* cited by examiner

Primary Examiner—John Barlow
Assistant Examiner—Ly T Tran

(57) ABSTRACT

A method of printing an ink jet ink on a print medium is provided, wherein a printed image is formed that is both waterfast and smearfast. The method employs a water-insoluble colorant and comprises: (a) providing an aqueous-based ink containing at least one disperse, sublimation dye and at least one dispersant for dispersing the dye; (b) jetting the ink onto the print medium to form an intermediate printed image; and (c) subjecting the print medium to a combination of heat and pressure for a period of time to convert the intermediate printed image to the waterfast and smearfast printed image. The temperature is high enough to cause the disperse, sublimation dye to disintegrate and diffuse into the print medium, thereby diffusing the coloring agents out of the dispersant "shell" around the dye particulate and recondensing in the same place as solvent dyes, free of the dispersant. Solvent dyes are insoluble in water. Thus, the recondensed solvent dyes on the substrate are essentially impervious to water, and the printed ink attains a waterfastness and smearfastness not previously achieved in aqueous thermal ink jet printing.

13 Claims, 4 Drawing Sheets

WATERFAST AND SMEARFAST INKS USING INK JET DELIVERED DYE SUBLIMATION DYES

TECHNICAL FIELD

The present invention is directed generally to ink jet inks, and, more particularly, to ink jet inks having both improved waterfastness and smearfastness.

BACKGROUND ART

Ink jet prints formed from ink jet inks employing water-insoluble colorants, such as pigments, typically do not have very good smearfastness, even though other properties of the ink are improved with the presence of the colorant. This is due to the fact that the inks are water-based. Dispersants are designed to "solubilize" the colorant particles, and as a consequence, the ink is rendered more susceptible to smear, such as when using a highlighter pen.

Emulsion polymer systems have been developed to co-print with the colorants, which, upon drying, create polymeric films that protect the colorant from abrasion and chemical attack. However, these additives are, in many instances, quite difficult to formulate for ink jet applications.

The present invention is an improvement over U.S. Pat. No. 6,090,749, issued Jul. 18, 2000, to the present inventor and assigned to the same assignee as the present application. The '749 patent is directed to a method for applying clear, vivid, and water-fast printed images to a substrate, and employs an ink containing a sublimable dye diffusion thermal transfer coloring agent. The substrate includes a backing layer and an ink absorbent layer on the backing layer. The backing layer is designed to receive the coloring agent therein after sublimation of the coloring agent. While the patent is quite useful for its intended purpose, it requires a special print medium, comprising a specialized multi-layer substrate.

There remains a need for an ink jet ink that employs water-insoluble colorant, together with a dispersant, which is both waterfast and smearfast and is suitable for printing on common print media, such as paper.

DISCLOSURE OF INVENTION

In accordance with the present invention, a method of printing an ink jet ink on a print medium is provided, wherein the resulting printed ink is both waterfast and smearfast, employing a water-insoluble colorant. The method comprises:

(a) providing an aqueous-based ink containing at least one disperse, sublimation dye and at least one dispersant for dispersing the dye;

(b) jetting said ink onto the print medium to form an intermediate printed image; and (c) subjecting the print medium to a combination of heat and pressure for a period of time to convert the intermediate printed image to the waterfast and smearfast printed image. The temperature is high enough to cause the disperse, sublimation dye particle to disintegrate and diffuse into the media.

Further in accordance with the present invention, the aqueous-based ink as described above is employed in combination with an ink jet printing unit, including an ink jet printing cartridge containing the aqueous-based ink jet contained therein. The ink jet printing unit is configured to print images on a print medium, and the ink jet printing unit is also associated with apparatus for applying heat and pressure to images printed on the print medium.

The approach of the present invention does not require the addition of polymers to the ink; rather, it takes advantage of the change of state of the sublimation dispersed dye solid to gas to solid, shedding the solubilizing dispersant, and yielding in effect a solvent dye that is not soluble in water and unaffected by abrasion. Smear data provide evidence of the increased smearfastness afforded by the method of the present invention.

BEST MODES FOR CARRYING OUT THE INVENTION

Figure 1:
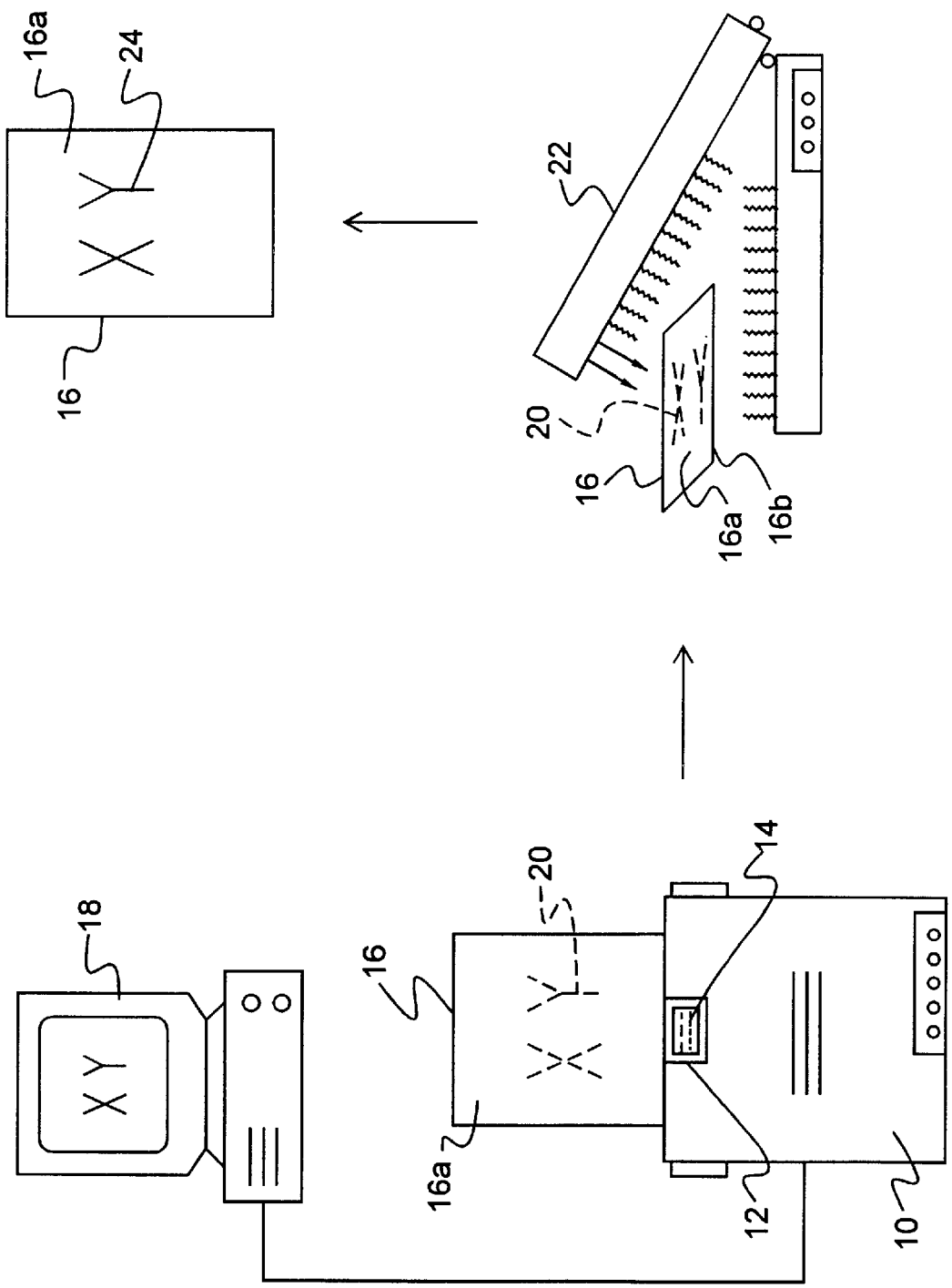
FIG. 1 is a sequential, schematic view of the steps which are used to deliver a printed image to a printable substrate, using the materials and processes of the present invention, including an ink-jet ink containing a sublimation dye in combination with heating and pressure to form a waterfast and smearfast image.

1. Ink Composition.

The present invention employs an ink composition that comprises an ink vehicle and at least one coloring agent. The coloring agent is a water-insoluble dye from the class of dyes known as solvent, or disperse, dyes. These dyes are, in general, substantially insoluble in water and completely or partially soluble in organic solvents. Of particular interest in the present invention is a sub-class of solvent dyes known as sublimation dyes. These dyes disintegrate and diffuse into the media at temperatures as low as about 200° C.

All of the sublimation coloring agents employed in the method of the present invention basically involve "dispersions" in which micro-particulate dye solids are essentially suspended within a dispersant system preferably containing water and a selected liquid or solid chemical dispersing agent. Many different commercially-available sublimation coloring agents may be employed in the practice of the present invention, which shall not be restricted to any particular ingredients for this purpose. For example, a first class of dye compositions consists of a group of materials known as "liquid colors", which basically involve sublimation coloring agents (in micro-particulate form) which are already suspended in a selected dispersant system of the type listed above. These "liquid color" materials typically contain about 50 to 80 wt % water, about 10 to 20 wt % of the coloring agent, about 5 to 10 wt % of the dispersant (either a solid or liquid type as discussed below), and about 5 to 20 wt % of a humectant (for inhibiting water evaporation). Representative, non-limiting examples of these pre-manufactured, ready-to-use liquid color materials are commercially available from many sources including, but not limited to, BASF of Charlotte, N.C. under the trademark BAFIXAN. Examples of the coloring materials available from BASF include the following, with the C.I. (Color Index) name of the coloring agent in the composition being listed following the commercial name of the product: (1) BAFIXAN RED BF (C.I. Disperse Red 60); (2) BAFIXAN YELLOW 3GE (C.I. Disperse Yellow 54); (3) BAFIXAN BLUE R (C.I. Disperse Blue 326); and (4) BAFIXAN BLACK BN (a blend of C.I. Disperse Red 60, C.I. Disperse Yellow 54, and C.I. Disperse Blue 79). Many other formulations involving the above-listed and other C.I. sublimation dyes may also be employed in the practice of the present invention.

Another class of ink compositions containing one or more sublimation dye coloring agents which may be employed in the practice of the present invention involve solid dye materials (e.g., in powder form) that can be combined during ink formulation with a selected liquid or solid dispersing agent, water, and the like. Specifically, these materials do not involve "pre-manufactured" liquid dye compositions as previously described in connection with the "liquid colors" listed above. Instead, they are subsequently converted into a liquid dispersion (having similar ingredients and proportions as those designated above in connection with the "liquid colors") immediately before or during ink production. Representative, non-limiting examples of these solid dye compositions include the following, with the C.I. (Color Index) name of the coloring agent in the composition being followed by the commercial name of the product: (1) C.I. Disperse Blue 3 (Keystone Aniline, Chicago, Ill.—SUBLAPRINT BLUE 70014); (2) C.I. Disperse Blue 14 (Keystone Aniline, SUBLAPRINT BLUE 70013); (3) C.I. Disperse Blue 72 (Tricon Colors, Elmwood, N.J.); (4) C.I. Disperse Blue 359 (Crompton & Knowles, Charlotte, N.C.—INTRATHERM BLUE P-1305NT); (5) C.I. Disperse Red 60 (Crompton & Knowles—INTRATHERM BRILLIANT RED P1314NT); and (6) C.I. Disperse Yellow 54 (Crompton & Knowles—INTRATHERM YELLOW P343NT). Again, the present invention is not limited to any particular sublimation dye coloring agents and ink compositions containing the same, with the representative products listed above being provided for example purposes.

In both of the previously-described classes of dye compositions (e.g., "liquid colors" and solid colorant materials), at least one liquid or solid dispersing agent is employed. Many different dispersing agents may be used for this purpose, including, but not limited to, acrylic polymers sold under the trademark JONCRYL by S. C. Johnson Co., Racine, Wis., condensed naphthalene sulfonates sold under the trademark LOMAR by the Henkel Co. of Kankakee, Ill., and sodium lignosulfonates sold by Lignotech, Rothschild, Wis. As noted above, the final liquid dye product (in completed dispersion form) in both embodiments will typically include about 50 to 80 wt % water, about 10 to 20 wt % dye, about 5 to 10 wt % dispersant, and about 5 to 20 wt % humectant. Representative humectants include 2-pyrrolidone, 1,5-pentanediol, diethylene glycol, and 2-ethyl-2-hydroxymethyl-1,3-propanediol. However, these values and materials may be varied in accordance with the particular dye compounds under consideration and other factors. Likewise, the completed ink composition in the present case will preferably contain about 0.1 to 12.5 wt % completed dispersion containing the selected sublimation dye coloring agent (e.g., the selected dye plus dispersant materials in combination).

Having described in detail the coloring agents and materials to be employed in the practice of the present invention, the other ink ingredients of primary concern will now be discussed. In addition to the coloring agents listed above, the ink composition will also include an ink "vehicle", which is primarily used as a carrier medium for the other components in the completed ink product. The term "vehicle" is typically defined to encompass all of the other ingredients in the completed ink composition aside from the colorant materials. In this regard, many different materials may be employed as the ink vehicle (alone or in combination), with the claimed invention not being limited to any particular compositions for this purpose. A preferred primary ink vehicle component will consist of water, although other compositions may be employed in combination with water, including 2-pyrrolidone, ethoxylated glycerol, diethylene glycol, 1,5-pentanediol, N-methyl pyrrolidone, 2-propanol, polyethylene glycol, and 2-ethyl-2-hydroxymethyl-1,3-propanediol. These materials are commercially available from numerous sources, including, but not limited to, Aldrich Chemicals, Inc., Milwaukee, Wis. All of these components can be used in various combinations as determined by preliminary pilot studies on the ink compositions of concern. However, in a preferred embodiment of the ink composition listed above will include about 87.5 to 99.9 wt % total combined ink vehicle (e.g., all of the vehicle components in combination). Likewise, the ink composition will typically contain about 50 to 80 wt % water and about 10 to 40 wt % organic solvent materials of the type listed above.

Next, the ink composition may include a number of optional ingredients as part of the total ink vehicle in varying amounts. For example, an optional biocide may be added to prevent any microbial growth in the final ink product. Exemplary biocides suitable for this purpose include proprietary products sold under the trademarks PROXEL GXL by Avecia, Manchester, England; UCARCID 250 by Union Carbide, Danbury, Conn.; and NUOSEPT 95 by Huls America, Inc., Piscataway, N.J. In a preferred embodiment, if a biocide is used, the final ink composition will contain about 0.05 to 0.5 wt % biocide, with about 0.2 wt % being preferred.

Finally, one or more optional humectants may be employed in the completed ink product. These materials are intended to inhibit water evaporation as noted above. Representative humectant compositions suitable for this purpose (which may also function as solvents) include, but are not limited to, 2-pyrrolidone, 1,5-pentanediol, diethylene glycol, and 2-ethyl-2-hydroxymethyl-1,3-propanediol. In a preferred embodiment, the ink composition employed in the practice of the present invention will include about 5 to 40 wt % humectant therein (if used). Additional ingredients (e.g., surfactants) may also be present in the ink if needed.

The completed ink compositions may then be used directly in the methods of the present invention. Upon completion, the ink compositions will typically have an average viscosity of about 1.0 to 5.0 centipoise (cp), with a surface tension of about 30 to 55 dynes/cm, although these values are subject to variation in accordance with the specific materials that are selected to produce the final ink product. The following ink formulations represent non-limiting, specific examples of completed ink products which may be used in the claimed process which include (1) a sublimation dye colorant and (2) an ink vehicle:

| Ingredient | Concentration (wt %) |
| --- | --- |
| Sublimation dye coloring agent (C.I. Disperse Red 60 - BAFIXAN RED BF) | 7.5 |
| 1,5-pentanediol (solvent/humectant) | 25 |
| water | 67.5 |

| Ingredient | Concentration (wt %) |
|---|---|
| Sublimation dye coloring agent (C.I. Disperse Blue 326 - BAFIXAN BLUE R) | 12.5 |
| 2-pyrrolidone (solvent) | 8 |
| ethoxylated glycerol (solvent) | 8 |
| polyoxyalkylene polyol (solvent) | 1 |
| water | 70.5 |

As previously noted, the present invention is not limited to the representative ink compositions listed above, which are provided for example purposes.

2. Image Printing Process.

A representative procedure for generating clear, vivid, and waterfast printed images on a substrate, or print medium, is now described. While many different printing systems may be employed to deliver the desired ink composition onto the image-receiving substrate, the present invention is advantageously employed in thermal ink jet technology, and the following description is so directed. The printed image may be either monochromatic or multi-colored. While thermal ink jet technology is specifically discussed herein, it will be appreciated by those skilled in the art that other drop-on-demand technologies, such as piezoelectric, may also be used in the practice of the present invention. Further, other printing technologies, such as continuous ink jet, may also be used in the practice of the present invention.

With reference to FIG. 1, a thermal ink jet printing unit 10 is provided which is used as the printing apparatus in this embodiment. Many different systems may be selected for use in connection with the printing unit 10, including printers manufactured and sold by the Hewlett-Packard Company, Palo Alto, Calif. under the following product designations: DESKJET 400C, 500C, 540C, 660C, 693C, 820C, 850C, 870C, 1200C, and 1600C, although the present invention is not limited to these specifically enumerated printers. A thermal ink jet cartridge unit 12 is provided within the printing unit 10 which is supplied with the selected ink composition 14, as described above. Again, many different cartridge types may be employed in this case which include a housing, a printhead attached to and in fluid communication with the housing, and at least one ink ejector in the printhead (e.g., one or more thin film tantalum-aluminum resistors if thermal ink jet systems are involved). However, in the printing unit 10 associated with this embodiment, a thermal ink jet cartridge 12 is employed, with a number of commercially available cartridge units being suitable for this purpose, including those produced by the Hewlett-Packard Company under one of the following product designations: 51641A, 5164A, 51640C, 51640A, 51629A, and 51649A, although the present invention is not limited to these specifically enumerated cartridges. Such thermal ink jet cartridges are well-known and are disclosed in a number of references, including above-referenced U.S. Pat. Nos. 6,090,749 and 5,278,584 to Keefe et al, among others. As previously noted, the ink composition 14 contains at least one ink vehicle and at least one sublimation dye coloring agent.

Next, an image-receiving substrate 16 is provided and inserted into the printing unit 10. The image-receiving substrate, or print medium, 16, may comprise any of the common print media employed in ink jet printing, and especially plain paper, whether provided with a coating or not.

The printing unit 10 is electrically connected to an image generating apparatus 18, which may involve many different systems selected from the group consisting of a personal computer (e.g., of the type manufactured by the Hewlett-Packard Company under the trademark PAVILION), a scanner (e.g., of the type sold by Hewlett-Packard Company under the trademark SCANJET), a digital camera, an internet device or appliance or some combination of the above. In this regard, the claimed method shall not be restricted to any particular image generation device or protocol.

Next, the image generating apparatus 18 and the printing unit 10 are cooperatively activated in order to deliver a desired intermediate printed image 20 onto the image-receiving substrate 16 (shown in phantom in FIG. 1). Both the image generating apparatus 18 and the printing unit 10 are used to control the operation of the ink cartridge 12. As is well-known, the printing process is initiated by activation of the ink ejectors in the printhead of the ink cartridge 12. Selectively energizing the thin-film resistors in the printhead 12 causes ink to be expelled outwardly through the ink ejection orifices in the printhead onto the image-receiving substrate 16. In this manner, the cartridge 12 may be used to deliver the intermediate printed image 20 to the image-receiving substrate 16 using the ink composition described above.

Delivery of the ink composition 14 to the top surface 16a of the print medium 16 as described above causes the ink composition to be absorbed entirely or at least partially into the print medium. Whether the ink composition 14 is entirely absorbed into the print medium 16 or only partially absorbed (with some of the ink composition remaining adsorbed on the top surface 16a of the print medium), both of these interactions between the ink composition 14 and the print medium 16 shall be considered equivalent in function, purpose, and final result.

At this stage, the intermediate printed image 20 is characterized as "intermediate", since the sublimation coloring agent(s) in the ink composition 14 have not yet been activated. This results in a printed image which, while sharp in edge acuity, has non-vivid color characteristics due to the unsublimed, particulate nature of the coloring agents at this stage in the claimed method.

The printed substrate 16 is now ready for the next step in the production process. With continued reference to FIG. 1, the substrate 16 is heated to a temperature to cause diffusion of the sublimation dye diffusion coloring agents in the ink composition 14. In a preferred and non-limiting embodiment, this step is achieved by heating the entire substrate 16 to a temperature of about 180° to 220° C. over a non-zero time period of less than about 30 seconds. However, these parameters may be varied as needed in accordance with the particular ink compositions being employed and the specific materials used in conjunction with the substrate 16 as determined by routine preliminary tests, as well as the heat and pressure components of the printing apparatus employed.

This step of the present invention (which involves heating the substrate 16) is accomplished using a heating apparatus 22 schematically shown in FIG. 1. Many different systems may be employed as the heating apparatus 22, with the claimed invention not being restricted to any particular devices for this purpose. For example, in a representative embodiment, a conventional heat press may function as the heating apparatus 22. A commercially available heat press system suitable for this purpose is available from the HIX Corporation (Pittsburgh, Kans.) as model no. N-800. When this type of heat press system is used, an optional additional step would involve the placement of a temporary film-type cover sheet (e.g., made of polytetrafluoroethylene [Teflon®]

—not shown) on the top surface 16a of the substrate 16 during the heat-pressing process. Since the use of a heat press necessarily involve direct physical contact between the substrate 16 and the plate members of the heat press unit, the use of an optional cover sheet will protect the top surface 16a of the substrate 16 from dirt, physical abrasion/damage, and excessive (uneven) heat concentration. Likewise, the cover sheet will keep the heat press clean. The decision to use a cover sheet may be reached in accordance with one or more preliminary tests on the substrates 16 being printed and the particular type of heating apparatus 22 under consideration.

A number of other heating systems may also be used as the heating apparatus 22 including (1) a continuous web transfer press of conventional design which may be obtained, for example, from GBC Pro-Tech (DeForest, Wis.); (2) conventional infrared illumination/heating systems; and (3) conventional resistance or microwave-type heating units (ovens). Thus, as noted above, the claimed process shall not be restricted to any particular heating devices or systems in connection with the heating apparatus 22. It should be noted that a more specialized, self-contained heating system will be discussed below in an alternative, and preferred, embodiment of the invention (see FIG. 2).

While the above discussion has been primarily directed to heating systems, a further step of the present invention involves the application in a uniform manner to the substrate 16 (e.g., to the top surface 16a, the bottom surface 16b, or both surfaces of the substrate). Pressure application optimally occurs during the heating step. This additional step is particularly appropriate when a heat press system of the type described above is used as the heating apparatus 22, with the application of pressure to the substrate 16 further enhancing the dye diffusion/affixation process. Conventional heat press systems as shown in FIG. 1 operate by pressing the printed substrate 16 between dual plate-like press members. As a result of this "pressing" process, pressure is uniformly applied to both the top and bottom surfaces of the substrate 16 during the application of heat. Even if other heating systems are employed in the claimed method, pressure may still be applied to the substrate 16 using any known or conventional press system or pressure-exerting device. Regardless of which approach is selected to deliver pressure to the substrate 16, efficient results are achieved when pressure levels are applied to the substrate (e.g., to the top surface 16a, the bottom surface 16b, or both surfaces) within a range of about 3 to 40 psi during or immediately after heating.

The particular pressure levels of interest may again be determined in accordance with preliminary studies on the materials being processed. Accordingly, the claimed invention shall not be restricted to any particular pressure levels.

As the substrate 16 is heating within the heating/pressing apparatus 22 in accordance with the parameters listed above, the sublimation dye coloring agent in the ink composition 14 (which was present in micro-particulate, solid form prior to heating) undergoes diffusion within the substrate 16. The sublimation process employed herein involves the disintegration of the dye particle and diffusion into the print media. As a result of this step, the coloring agents diffuse out of the dispersant "shell" around the dye particulate and recondense in the same place as solvent dyes, free of the dispersant. As noted earlier, solvent dyes are insoluble in water. Thus, the recondensed solvent dyes on the substrate are essentially impervious to water, and the printed ink attains a waterfastness and smearfastness not previously achieved in thermal ink jet printing.

With continued reference to FIG. 1, the substrate 16 with the final printed image 24 thereon is then removed from the heating/pressing apparatus 22 and is used as desired. Again, it is important to emphasize that the present invention may involve many different coloring agents, substrate materials/sizes, and other factors which are determined in accordance with the intended use of the final printed product.

Figure 2:
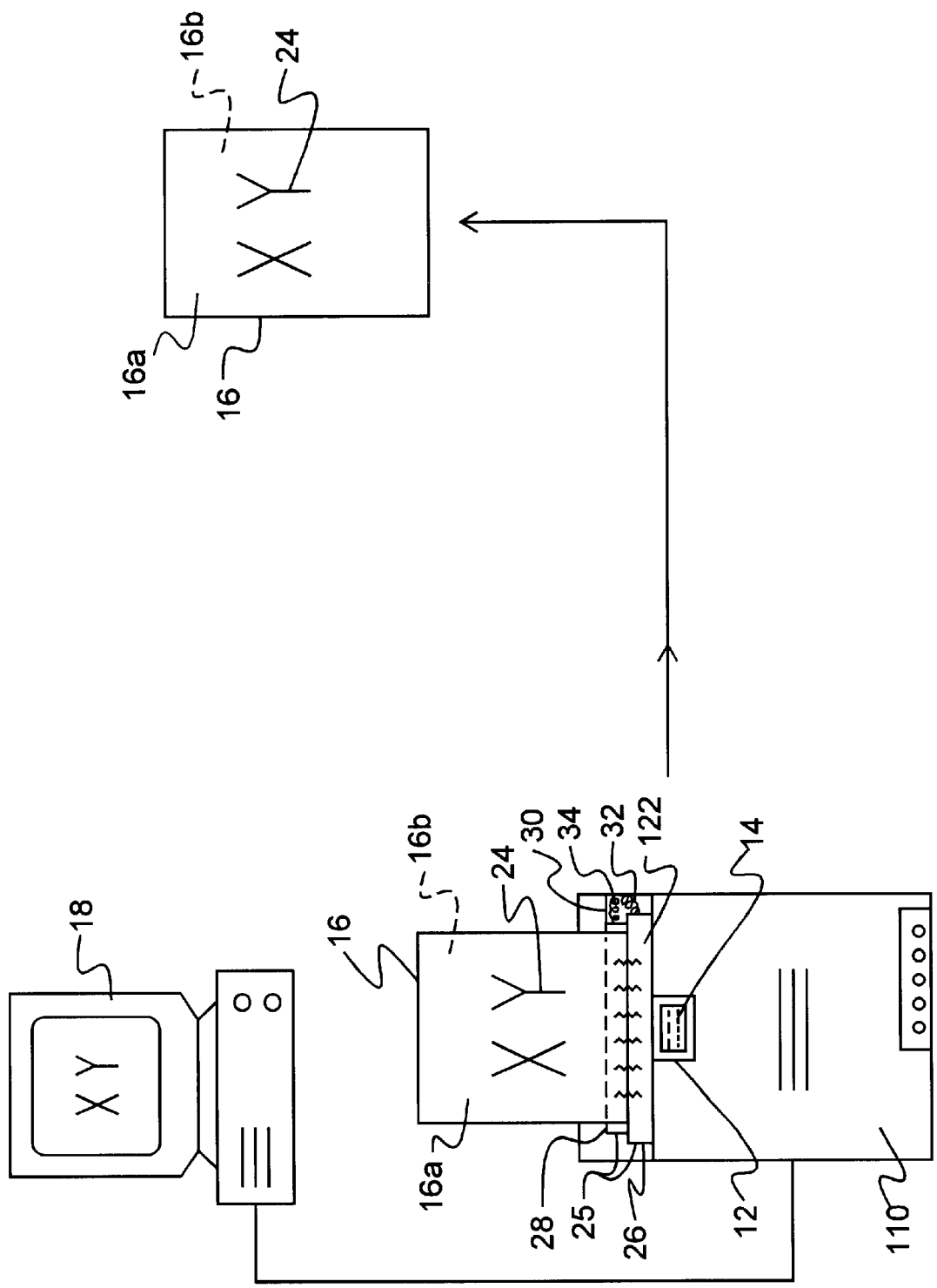
FIG. 2 is a sequential, schematic view of the steps used to deliver a printed image to a printable substrate in an alternative embodiment of the present invention, which uses a different heating method.

An alternative embodiment of the process and system illustrated in FIG. 1 is schematically shown in FIG. 2. All of the steps, parameters, materials, and chemical compositions associated with the embodiment of FIG. 1 are equally applicable to the embodiment of FIG. 1 unless otherwise indicated. Reference numbers of FIG. 1 which correspond with those of FIG. 2 signify parts, components, and elements which are common to the structures and process steps in both embodiments. These common elements are discussed above in connection with FIG. 1, with the discussion of these elements being incorporated by reference relative to the embodiment of FIG. 2.

As illustrated in FIG. 2, the substrate 16 and ink composition 14 are the same as those discussed above in connection with FIG. 1. However, the manner in which the substrate 16 is heated and subjected to pressure is different compared with the embodiment of FIG. 1. Specifically, with reference to FIG. 2, the printer unit 110 includes a heating/pressure-exerting apparatus 122 therein (e.g., with the term "therein" involving a situation in which this subsystem is either placed inside the printer unit 110 or is externally attached to the printer unit). This embodiment shall not be restricted to any type of integral heating/pressing system, provided that the printer unit 110 incorporates one or more heat-generating and pressure-exerting subsystems which deliver heat and pressure to the substrate 16 during or immediately after to heating process.

Heat and pressure may be applied much like as is done in laserjet printing. Alternatively, a pair of heated rollers may be used. Other analogous schemes may alternatively be employed for subjecting the printed substrate 16 to heat and pressure, and all such schemes are considered to be within the scope of the present invention.

As with FIG. 1, in a preferred and non-limiting embodiment, the temperature of heating is within the range of about 180° to 220° C., the pressure is within the range of about 3 to 40 psi, and the time of heating/pressing is within the range of about 5 to 30 seconds. However, these parameters may again be varied as needed in accordance with the particular ink compositions being employed and the specific materials used in connection with the substrate 16 as determined by routine preliminary tests.

To heat the substrate 16 at the temperature and pressure levels listed above over the time range indicated, the printer unit 110 includes at least one heating member 122 inside the printer unit 110 or otherwise attached thereto. The heating member 122 (which generally functions as the heating apparatus 22 in this embodiment) may involve one or more elements 25, including (1) apparatus analogous to laser fusion (roller and fuser combination) and (2) apparatus comprising a pair of "pinch"-type rollers, at least one of which is heated, through which the substrate 16 is passed. Other heating elements may alternatively be used, including, without limitation, platens, rods, bars, plates, and the like. Thus, as noted above, the claimed process shall not be restricted to any particular heating devices or systems in connection with the heating apparatus 122.

The heating/pressing member 122 is designed to come in direct physical contact with the top surface 16a, the bottom surface 16b, or both surfaces of the substrate 16 after or during the printing state of the claimed process. As a result, the necessary amount of heat and pressure may be efficiently applied to the substrate 16 (with the exact heating time, pressure, and temperature levels being controlled by the delivery speed of the printing unit 110, namely, the rate at which the substrate 16 is ejected from the printing unit as determined by preliminary tests). Operation of the heating/pressing member 122 and printer unit 110 may be adjusted as needed to ensure that sufficient heating of the substrate 16 for the necessary time period takes place, with these parameters being subject in variation in accordance with many factors including the materials that are used in the ink composition 14 and substrate 16. Likewise, the exertion of pressure against the substrate 16 at the levels listed above may be accomplished by adjustment of the tension associated with the heating member 122 as it pushes against the substrate. By placing the substrate 16 in contact with the heating/pressing member 122 in the foregoing manner, a stable, vivid, waterfast, and smearfast printed image may be created on the substrate 16 from the ink composition 14.

In the specific, non-limiting embodiment of FIG. 2, the heating member 122 consists of dual heating metallic rollers 26, 28 which include one or more electrical resistive-type heating elements therein. The roller 26 contacts the top surface 16a of the substrate 16. with the roller 28 contacting the bottom surface 16b of the substrate. Proper and desired pressure levels within the preferred range listed above are maintained through the use of a spring-biased tensioning system 30 of conventional design (schematically illustrated in FIG. 2) which is attached to the rollers 26, 28. This particular system basically involves one or more spring elements 32, 34 which urge the rollers 26, 28 against the substrate 16. However, the present invention shall not be restricted to the specific components described above which are provided for example purposes only. Either one or multiple heating members 122 may be used in conjunction with the substrate 16 as needed and desired. While the "pinch roller" embodiment of FIG. 2 is preferred and provides ideal results, the heating member 122 positioned within the printer unit 110 may simply involve an electrically-heated bar member or plate which is placed in direct contact with the top surface 16a of the substrate 16 as it passes out of the printer unit 110. Or, alternatively, a "fuser roll" of the type employed in laserjet printing may be employed, with the substrate 16 subjected to heating and pressing as it passes out of the printer unit 110. Thus, many variations are possible in connection with the embodiment of FIG. 2, provided that they encompass the basic process described above, namely, a sequential diffusion procedure in which sublimation coloring agents are first printed onto a print medium, or substrate, 16 and then are converted into water-insoluble colorants by the application of heat and pressure from the heating/pressing member 122. This particular system eliminates the need for a heating/pressing apparatus 22 which is located outside of the printer unit 110. However, the result of this embodiment is the same as that provided by the embodiment of FIG. 1, namely, the production of a substrate 16 having a final printed image 24.

As previously noted, the present invention provides numerous benefits and advantages, including: (1) the rapid printing of reasonably clear and vivid ("high chroma") images with a minimal amount of equipment and process steps; (2) enhanced image waterfastness, smearfastness, and stability; (3) a minimal level of complexity and required equipment which facilitates at-home use by consumers; (4) the ability to use thermal ink jet technology (or other comparable printing technology) to generate high resolution multi-color images which are characterized by improved stability levels; and (5) the ability to accomplish these goals using low-cost materials and equipment.

EXAMPLES

An ink formulation ("dispersed dye") was prepared as follows:

| | |
|---|---|
| BASF Dispersed Dye Black | 3 wt % |
| 2-pyrrolidone | 10 wt % |
| PEG-200 | 10 wt % |
| Polyoxyalkylene polyol | 1 wt % |
| Water | balance. |

Notes: The BASF Dispersed Dye Black is a composite black (combination of cyan, yellow, and magenta) and includes a proprietary dispersant.

The ink was printed onto various print media, specifically, various plain papers, with a Hewlett-Packard 51645A pen in which the black ink cartridge was filled with the disperse dye-based ink. The printing was performed on a Hewlett-Packard DeskJet 850C printer, under nominal conditions.

The printed paper was then placed on a press, heated at 190° C. under a pressure of 40 psi for 10 seconds, and then cooled. Alternatively, the printed paper could be run through a fuser-type mechanism, such as commonly used with LaserJet printers, designed to deliver similar heat, pressure, and residence time. For comparison, a pigment-based black ink ("pigment black"), which served as a control (H-P 51645A pen as commercially available), was printed onto various papers under the same printing conditions.

The papers printed on were: GBND (Gilbert Bond), HPMS (Hewlett-Packard MultiSystem), clay-coated (CC) (Hewlett-Packard Premium Ink Jet Paper), and WFCH (Weyerhauser First Choice).

A test for smearfastness was performed. The smearfastness test measures the amount of colorant transfer from the printed area with a highlighter. This test uses both an alkaline highlighter (Sanford Major Accent Fluorescent) and an acid highlighter (Sanford Major Accent) to simulate user highlighter use. The test was performed by passing a highlighter across a plurality of printed bars at a specific time, here, five minutes after printing for example. A two pass refers to passing the highlighter over the same area twice. In particular, a spring-loaded highlighter is used to apply constant pressure from one test to another.

A control patch is measured to obtain an optical density reading. Next, a measurement is made between the bars to obtain a second optical density reading. A large difference between the two readings is indicative of little or no transfer of colorant, and is desirable. There are two ways to express the transfer of color. The first is in terms of optical density in milli-OD units, and the second is the percent transfer of the original color. The latter is determined by the ratio of mOD/OD. In both instances, the measured value should be as small as possible.

A test matrix was planned, comparing the two inks with and without heat/pressure:

| Test Matrix | |
|---|---|
| Ink | Heat/Pressure |
| Pigment black | No |
| Pigment black | Yes |
| Dispersed Dye | No |
| Dispersed Dye | Yes |

The results are summarized in the Table below:

|  | Alkaline | | | | Acid | | | |
|---|---|---|---|---|---|---|---|---|
|  | GBND | HPMS | CC | WFCH | GBND | HPMS | CC | WFCH |
| Pigment black: Control | | | | | | | | |
| orig. OD | 1.45 | 1.35 | 1.45 | 1.45 | 1.47 | 1.31 | 1.46 | 1.46 |
| mOD | 262 | 187 | 55 | 296 | 283 | 152 | 1 | 236 |
| % trans | 18 | 14 | 4 | 20 | 19 | 12 | 0 | 16 |
| Pigment black: Heat Press 10 sec. at 190° C. and 40 psi | | | | | | | | |
| orig. OD | 1.44 | 1.33 | 1.44 | 1.43 | 1.43 | 1.34 | 1.45 | 1.41 |
| mOD | 179 | 146 | 20 | 85 | 81 | 69 | −6 | 99 |
| % trans. | 12 | 11 | 1 | 6 | 6 | 5 | 0 | 7 |
| Disperse Dye: Control | | | | | | | | |
| orig. OD | 0.84 | 0.82 | 1.27 | 0.79 | 0.89 | 0.83 | 1.25 | 0.81 |
| mOD | 131 | 56 | 3 | 60 | 108 | 47 | −4 | 43 |
| % trans. | 15 | 7 | 0 | 8 | 12 | 6 | 0 | 5 |
| Disperse Dye: Heat Press 10 sec. at 190° C. and 40 psi | | | | | | | | |
| orig. OD | 1.15 | 1.13 | 1.22 | 0.95 | 1.22 | 1.16 | 1.25 | 1.05 |
| mOD | 2 | 6 | 1 | 6 | −18 | −3 | −12 | 1 |
| % trans. | 0 | 1 | 0 | 1 | −1 | 0 | −1 | 0 |

Figure 3:
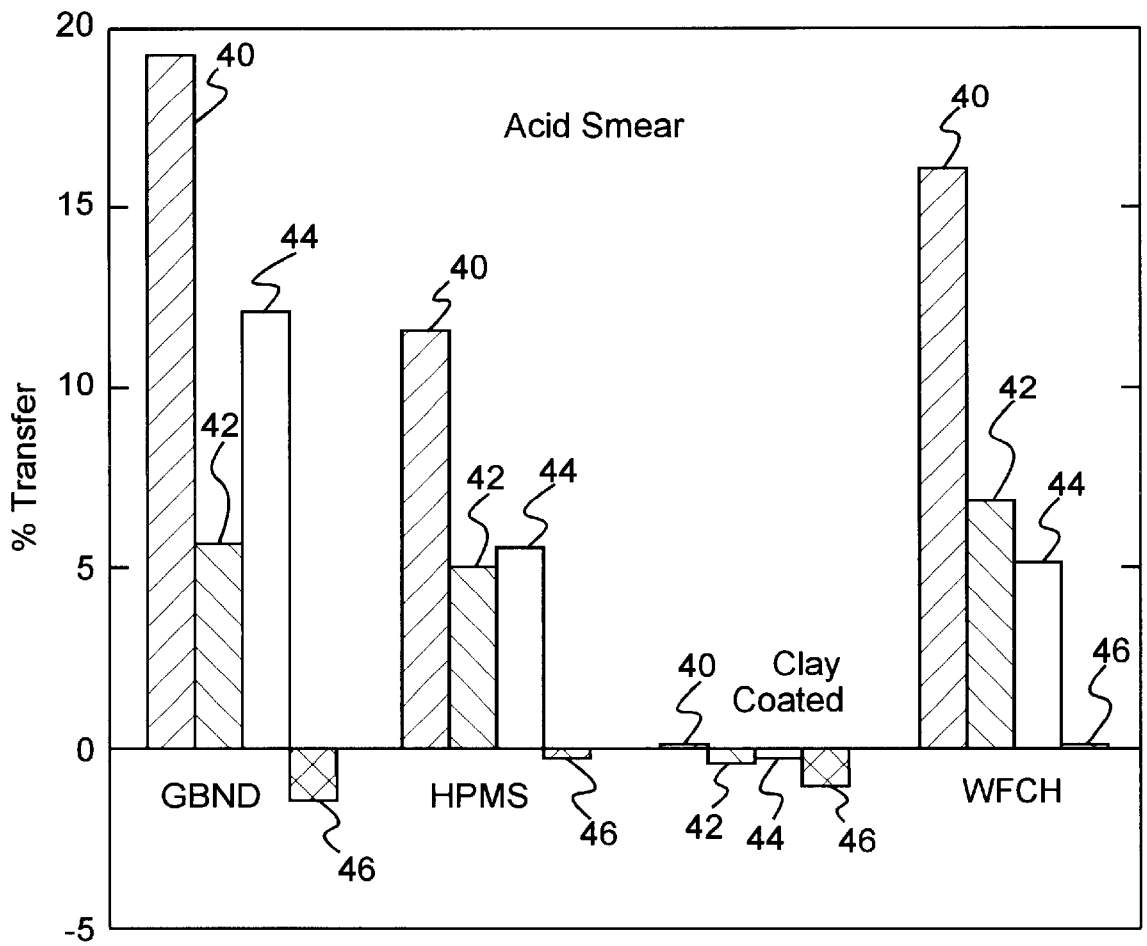
FIG. 3 is a histographic plot of percent ink transfer by an acid smear test of different inks on different papers (GBND=Gilbert Bond, HPMS=Hewlett-Packard MultiSystem, Clay coated=Hewlett-Packard Premium Ink Jet Paper, and WFCH=Weyerhauser First Choice)
Figure 4:
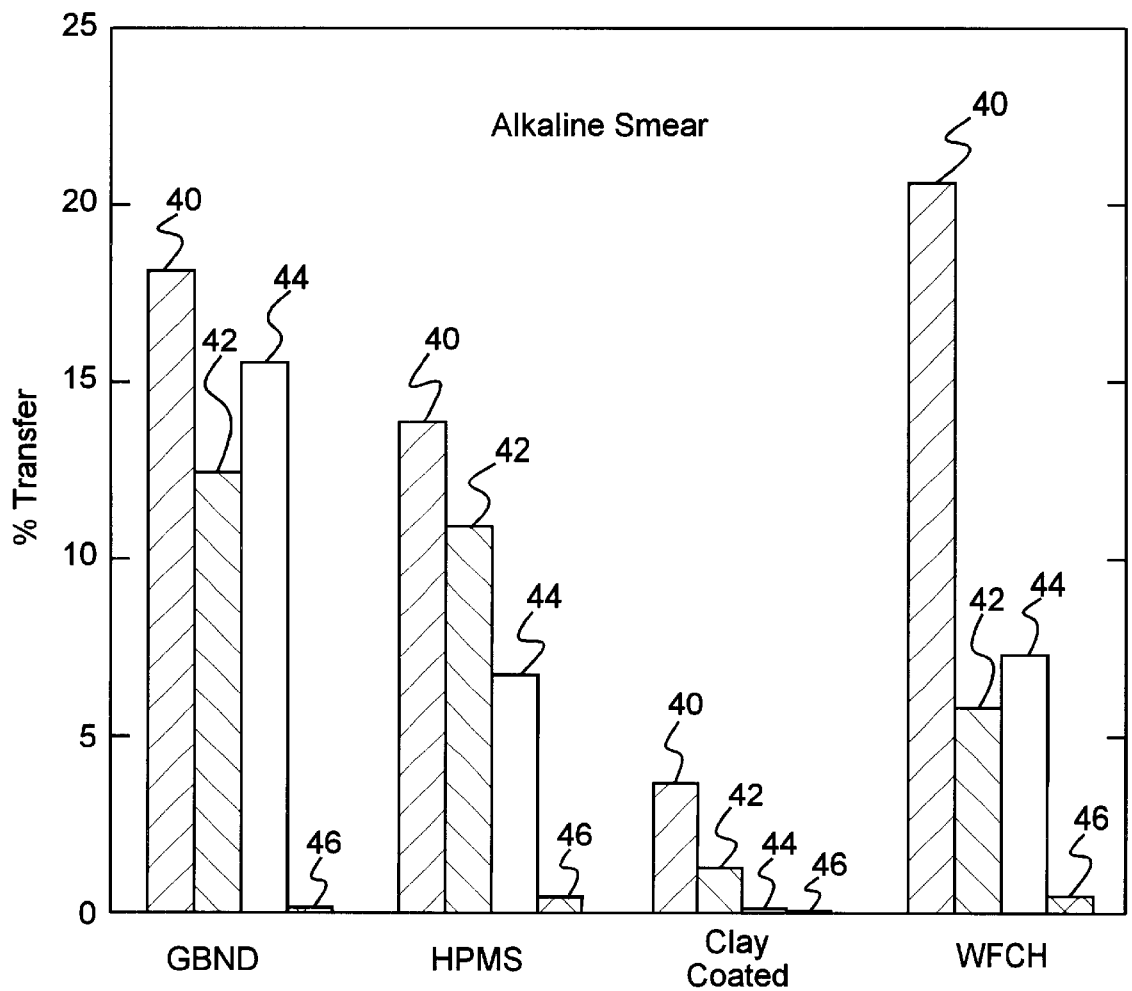
FIG. 4 is a plot similar to that of FIG. 3, but depicting the percent ink transfer by an alkaline smear test.

The results from the foregoing Table are depicted in FIGS. 3 and 4 for acid smear and alkaline smear, respectively. In FIGS. 3 and 4, bar 40 represents pigment black control; bar 42 represents pigment black subjected to heat and pressure; bar 44 represents disperse dye control; and bar 46 represents disperse dye subjected to heat and pressure, where the paper designations on the x-axis are as given above. Negative transfer numbers reflect errors in measurement.

From the foregoing data and FIGS. 3 and 4, it is clear that the combination of disperse dye and heat and pressure provides the most improvement in smearfastness. Prints using disperse dyes start with slightly better smearfastness, but when tested, the particles disintegrated, shedding the dispersant and filling voids in the paper.

INDUSTRIAL APPLICABILITY

The method of printing a disperse, sublimation dye in an aqueous-based ink onto a print medium and then subjecting the dye to a combination of heat and pressure to cause sublimation of the dye and resolidification as a water-insoluble dye on the print medium is expected to find use in printing applications where waterfastness and smearfastness of the printed image is required.

What is claimed is:

1. A method of printing an ink jet ink on a paper print medium is provided, wherein a printed image is formed that is both waterfast and smearfast, employing a water-insoluble colorant, said method comprising:
   (a) providing an aqueous-based ink jet ink containing at least one disperse, sublimation dye and at least one dispersant for dispersing the dye;
   (b) jetting said ink onto said paper print medium to form an intermediate printed image thereon; and
   (c) subjecting said paper print medium to a combination of heat and pressure for a period of time to convert said intermediate printed image to said waterfast and smearfast printed image on said paper print medium, said temperature being high enough to cause said disperse, sublimation dye to disintegrate and diffuse into said paper print medium.

2. The method of claim 1 wherein said paper print medium is either coated paper or uncoated paper.

3. The method of claim 1 wherein said temperature is within a range of about 180° to 220° C.

4. The method of claim 1 wherein said pressure is within a range of about 3 to 40 psi.

5. The method of claim 1 wherein said period of time is less than about 30 seconds.

6. In combination, an ink jet printing unit, including an ink jet printing cartridge, and an aqueous-based ink jet contained therein, said ink jet printing unit configured to print intermediate images on a paper print medium, said ink jet printing unit associated with apparatus for applying heat and pressure to said intermediate images printed on said paper print medium, thereby converting said intermediate images to final printed images on said paper print medium, wherein said ink jet ink contains at least one disperse, sublimation dye and at least one dispersant for dispersing said dye.

7. The combination of claim 6 wherein said apparatus is separate from said ink jet printing unit.

8. The combination of claim 7 wherein said apparatus comprises a heat press.

9. The combination of claim 6 wherein said apparatus is an integral part of said ink jet printing unit.

10. The combination of claim 9 wherein said apparatus comprises at least one heating member associated with applying said pressure.

11. The combination of claim 6 wherein said apparatus is configured to heat said print medium to a temperature within a range of about 180° to 220° C.

12. The combination of claim 6 wherein said apparatus is configured to apply said pressure within a range of about 3 to 40 psi.

13. The combination of claim 6 wherein said paper print medium is either coated paper or uncoated paper.

* * * * *